Patented Nov. 29, 1938

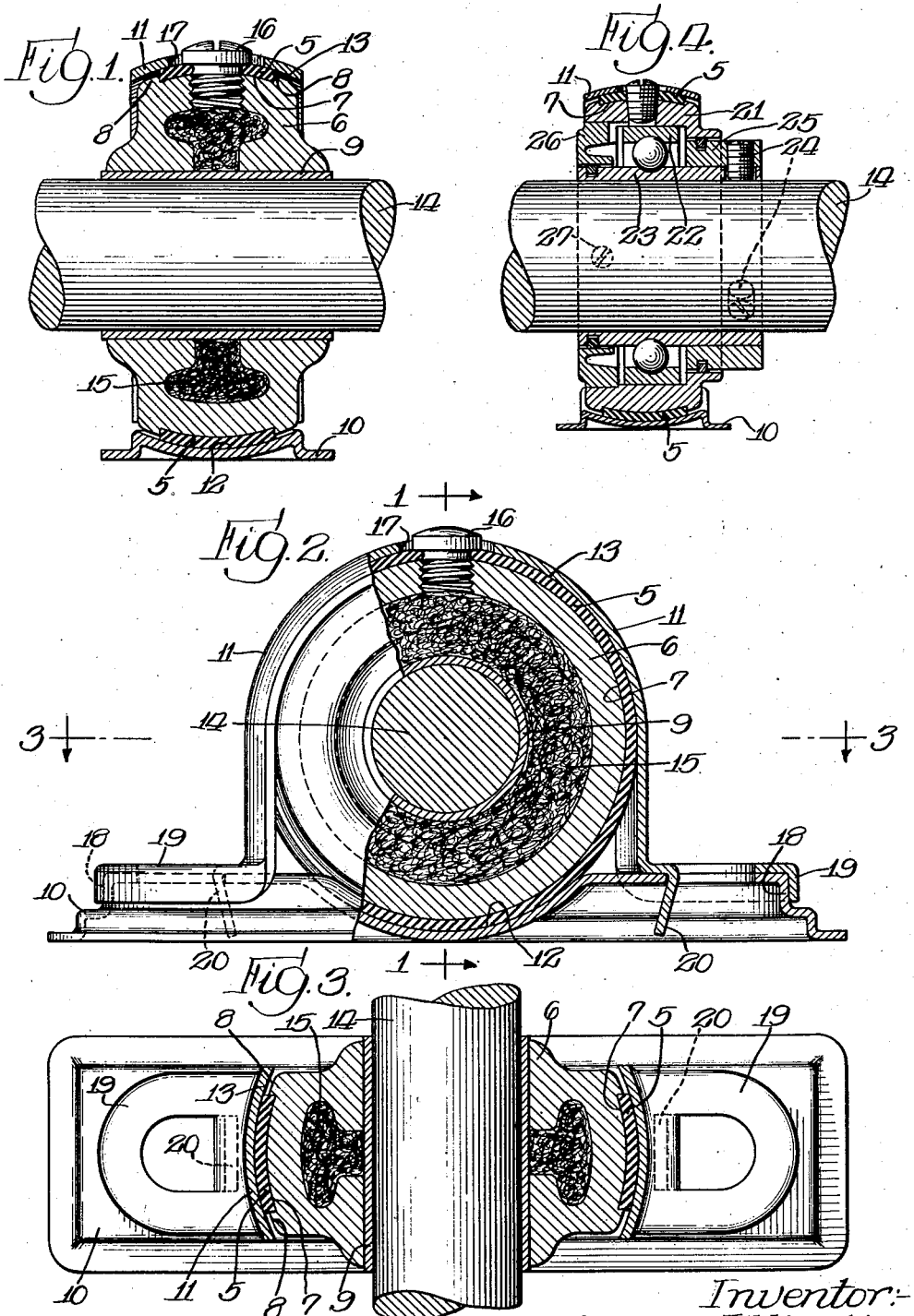

2,138,659

UNITED STATES PATENT OFFICE 2,138,659

SHAFT BEARING

Arnie J. Kindig, South Bend, Ind., assignor to Dodge Manufacturing Corporation, Mishawaka, Ind., a corporation of Indiana Application September 2, 1936, Serial No. 99,075

1 Claim. (Cl. 308—26)

This invention relates to shaft bearings.

Among other objects the invention is intended to provide a practicable shaft bearing for use in air conditioning units or under other conditions requiring silence.

In the provision of bearings for air conditioning units, the primary problem presented is the very difficult one of eliminating noise, since in this class of apparatus even a very slight noise is amplified and telegraphed along the air ducts. Hence the roaring sound incident to high speed rotation of a shaft in its bearing, though it may be comparatively faint and unobjectionable in the case of bearings used for ordinary purposes, is apt to become seriously disturbing in the case of a shaft bearing used in an air conditioning unit.

By the present invention, silencing of the bearing is accomplished by incorporation of a sound insulator in the bearing structure. The invention further involves incorporation of a sound insulator in a practicable and advantageous manner in the type of bearing structure in which the shaft bearing proper is in a ball-type member mounted for universal movement about its center to permit self-adaptation of the shaft bearing to the shaft alinement.

Advantages of the invention other than noise reduction or elimination are the simplification and reduction of cost of manufacture of the type of bearing structure alluded to, and the provision of means for allowing a micrometric self adjustment of the bearing in response to the minor fluctuations in shaft alinement which occur in individual shaft revolutions at high speed.

The invention may be embodied in different forms of shaft bearing structures including pillow blocks, drop shaft hangers, post hangers, bracket hangers, and the like.

For explanation of the invention, reference is made to the accompanying drawing showing illustrative embodiments thereof.

In said drawing:

Figs. 1, 2 and 3 represent an embodiment of the invention in a shaft bearing structure of the plain bearing type. Fig. 1 is a section taken on a vertical central plane through the shaft axis, this being a section on the line 1—1 of Fig. 2. Fig. 2 is a view of said structure partially in cross section and partially in elevation. Fig. 3 is a horizontal section taken through the axis of the shaft on the line 3—3 of Fig. 2 looking in the direction of the arrows, and showing in elevation the supporting base portion of the outer housing structure. Fig. 4 is a sectional view of a ball bearing pillow block embodying the invention.

As shown in the drawing, a sound insulating ring 5 is interposed between interfitted concentric parts of the illustrative shaft bearing structures. This ring may be of rubber or the like. A grade of rubber or rubber-like material should be selected which, in addition to withstanding the required conditions of service, will be sufficiently elastic to give slightly under load and act as a sound insulator and yet sufficiently firm, strong and heavy bodied to carry the load to which the bearing is subjected without too much yielding or possibility of setting up vibration. The synthetic rubber known as Duprene synthetic rubber is found admirable for the purpose. This material is more resistant than the ordinary rubber to oil and grease, as well as more resistant to heat, since it will stand a temperature of close to 300° F. without disintegrating, and has the desired qualities to function as a practical sound insulating and load carrying medium.

In Figs. 1, 2 and 3, the rubber ring 5 of uniform thickness and having concentric spherical inner and outer surfaces is fitted around the correspondingly spherical periphery of an annular shaft-bearing member 6, and is retained or held from lateral displacement by forming said member with a shallow peripheral groove in which the ring is placed. The ground surface of said groove is designated in the drawing by the numeral 7. The rubber ring may be initially of slightly less internal diameter than the outer diamter of the annular chamber 6, so as to require a slight stretching of the rubber ring to fit it around said member, though this is not indispensable. The thickness of the rubber ring is substantially greater than the depth of the groove, so that the retaining shoulders 8 at the sides of the rubber are of substantially less elevation than the outer spherical surface of said rubber ring. The annular shaft-bearing member 6, which may be a casting in the cylindric bore of which is pressed a shaft bushing 9 of suitable bearing metal or material, and the surrounding rubber ring 5 constitute together a ball member which is seated for ball motion in an outer housing and supporting structure which may be of the type disclosed in United States Patent to Carver, No. 1,931,055 of October 17, 1933, said housing and supporting structure comprising pressed steel base and cap members 10 and 11 cooperating to clasp the ball member, said base member having a concave seat at 12 and the interior surface of the cap member being concave as indicated at 13. It will be understood that the concave surfaces 12 and 13 are parts of a sphere fitting the outer spherical surfaces of the rubber ring, and that the center of the ball member and of the coacting surfaces in the outer housing and supporting structure is at the axis of the bearing, so as to allow universal angular self-adjustment of the shaft bearing member 6 as required to suit the shaft alinement. The rubber ring may be practically clasped or gripped between the concentric metal parts between which it is fitted, though not so tightly as to interfere with the desired permissible ball motion.

A shaft is designated in the drawing by the numeral 14. In the construction shown in Figs. 1, 2 and 3, the shaft turns in the bushing 9 and the annular member 6 may be considered as an inner housing containing a shaft bearing proper typified in this instance by this bushing; though it will be understood that said annular member, which in some instances might be divided or composed of semi-circular segments, may itself be of suitable bearing metal and that the shaft may bear directly in its cylindrical bore. In the particular construction shown, the cast member 6 is scored out to provide an annular grease chamber 15, the inner wall of which is provided by the bushing 9, said bushing in this instance being of a composition permeable by grease so that grease may seep through the bushing for lubrication of the shaft. A screw plug 16 normally closes the filling opening to the grease chamber. The head of this screw plug is accommodated in an opening 17 in the cap member 11, said opening being sufficiently large to provide necessary clearance to allow ball motion of the inner part of the bearing structure in the outer part.

As explained in the Carver patent, the base member 10 is constructed to provide raised portions 18 at either side of its medial socket portion, in which raised portions are bolt openings. The inverted U-shaped cap member has its legs bent to provide the foot portions 19 shaped to fit over said raised portions 18 of the base member. Bolt openings are also provided in these foot portions, but instead of stamping out the bolt holes the metal is so stamped as to provide spring clips or tongues 20 depending from edges of said bolt openings and bent inwardly as shown in Fig. 2 to engage the edges of the registering bolt holes in the base member, whereby to hold the cap member separably to the base member independently of fastening bolts. However, reliance is not placed upon the tongues 20 to hold the assembly together when it is mounted, but as will be apparent the holding down bolts (not shown) will pass through the registering bolt openings in the cap and base members, serving the double purpose of securing the base member to its support, and, at the same time, securing together positively the two portions of the outer housing. As the sheet metal outer housing members 10 and 11 hug the rubber ring 5 fitted around the inner housing or member 6, said rubber ring not only insulates or absorbs the noise that would ordinarily emanate from the inner member but also functions as a dampener in engagement with the surrounding sheet metal members, preventing emission of noise from these members and thus enabling the highly desirable outer housing and supporting structure disclosed in tthe Carver patent to be utilized without thwarting the purpose of obtaining a silent bearing satisfactory for use in an air conditioning unit.

The construction shown in Figs. 1, 2 and 3 is particularly desirable for a simple, practicable and economical shaft bearing structure. Among other advantages, the use in this structure of the rubber ring 5 obviates the necessity of machining the spherical outside of the member 6. This member may be made as a casting cored out to form the peripheral groove 7 in which the surrounding rubber ring is placed, and no machining whatever need be done on this member except to bore the center hole in which the shaft bushing is pressed. As the outer housing comprises parts stamped or pressed from thick sheet metal, no machining of these parts is necessary. The use of a shaft bearing 9 of a composition through which grease may seep from the surrounding grease chamber provides exceedingly simple and economical means for lubrication. Shaft bushings of appropriate composition for this purpose are supplied under the name "Bronzoil" by Dodge Manufacturing Corporation of Mishawaka, Indiana.

Although a shaft may be in true alinement with the bearing in which it turns, there may be a minute fluctuation in the shaft alinement occurring in every individual revolution of the shaft at high speed. It is desirable that a bearing should be able to respond readily to such minor misalinement in order to avoid high frequency strains on the bearing. In the illustrative construction, in which a layer of elastic or yieldable material 5 is sandwiched between the coacting spherical surfaces of the outer and inner housings or interfitted concentric parts of the shaft bearing structure, the impacts resulting from such minor fluctuations in the shaft alinement are cushioned by such interposed elastic layer, and the inner housing or member 6 is capable of a minute or micrometric universal motion about the ball center, within the limits allowed by the yielding of the rubber ring, without any actual slippage between the outer surface of the rubber ring and the outer housing. This is of advantage in enabling the bearing to respond readily to the minor misalignments occurring in the individual shaft revolutions, as the necessary adjustment occurs without the lag incident to overcoming the frictional resistance between the rubber ring and the outer housing.

The invention is applicable to shaft bearing structures of anti-friction bearing type as well as to shaft bearing structures of the plain bearing type. Fig. 4 shows an illustrative embodiment of the invention in a ball bearing pillow block of the specific construction shown and described in the aforesaid Carver Patent No. 1,931,055. In this construction the shaft bears in the annular inner housing 21 through the ball bearing assembly comprising concentric outer and inner bearing rings 22 and 23 and interposed balls, the inner ring 23 being elongated and fastened to the shaft by set screws 24 screwed through tapped holes in the collar 25 and passing through registering holes in the rear extended end of the inner bearing ring. The housing is closed at its front end by the closure plate 26 fastened in the housing 21 by fastenings one of which is indicated at 27 in dotted lines, all as explained in the Carver patent. The outer housing comprising the pressed steel base member 10 and cap member 11 is of the same construction as in said Carver patent, i. e. the same construction as shown in Figs. 1 to 3. The inner housing 21 is exteriorly similar to the corresponding member 6 in Fig. 1, and the rubber ring 5 is the same as in Fig. 1 and gives the same advantages in this structure as in the first described structure.

As already indicated, one of the outstanding advantages of this invention is that the ball member in which the shaft bearing proper is contained does not require any machining of its exterior surface. In actual practice the shaft-bearing member 6 in Fig. 1 is usually a casting having the groove for the rubber ring cored out. The corresponding member or inner housing 21 of Fig. 4 may also be a casting with the groove for the rubber ring similarly cored out. Thus the ground surface 7 of the groove, being a cored surface, may not be truly spherical, though in the sense of this specification spherical will be understood as including approximately spherical. But even though the ground surface may not be exactly spherical, a sufficiently close sphericity of the ball member as a whole is attained by virtue of the natural elasticity of the rubber band and its accommodation under the pressure of the outer housing. In other words the illustrative type of structure is such as to provide a ball member fitted for universal motion in an outer housing, said ball member being of a construction having an elastic layer constituting its surface portion, and thus allowing for certain inaccuracies in manufacture.

What I claim as my invention and desire to secure by Letters Patent is:

A shaft bearing structure comprising an annular member having therein a bearing for a shaft, said member having in its periphery a shallow groove extending around the periphery, the ground surface of said groove being spherical, a ring of non-metallic, elastic, load sustaining material fitted around said member in said groove, said ring having inner and outer spherical surfaces and being of greater thickness than the depth of said groove, and a housing in which said member is mounted, said member bearing in the housing through said ring.

ARNIE J. KINDIG.